US008069496B2

(12) United States Patent
Sesselmann

(10) Patent No.: US 8,069,496 B2
(45) Date of Patent: Dec. 6, 2011

(54) ODOR ABSORBING ARTICLE OF CLOTHING

(75) Inventor: Gregory J. Sesselmann, Muskegon, MI (US)

(73) Assignee: ALS Enterprises, Inc., Muskegon, MI (US)

(*) Notice: Subject to any disclaimer, the term of this patent is extended or adjusted under 35 U.S.C. 154(b) by 1960 days.

(21) Appl. No.: 10/713,686

(22) Filed: Nov. 14, 2003

(65) Prior Publication Data

US 2004/0107474 A1 Jun. 10, 2004

Related U.S. Application Data

(63) Continuation of application No. 10/050,203, filed on Jan. 16, 2002, now abandoned, which is a continuation of application No. 09/893,030, filed on Jun. 27, 2001, now abandoned, which is a continuation of application No. 09/621,442, filed on Jul. 21, 2000, now abandoned, which is a continuation of application No. 09/365,364, filed on Jul. 30, 1999, now Pat. No. 6,134,718, which is a continuation of application No. 09/127,162, filed on Jul. 31, 1998, now Pat. No. 6,009,559, which is a continuation of application No. 08/685,820, filed on Jul. 25, 1996, now Pat. No. 5,790,987, which is a continuation of application No. 08/373,588, filed on Jan. 17, 1995, now Pat. No. 5,539,930, which is a continuation of application No. 08/125,342, filed on Sep. 22, 1993, now Pat. No. 5,383,236, which is a continuation of application No. 07/798,288, filed on Nov. 25, 1991, now abandoned.

(51) Int. Cl.
*A41D 13/00* (2006.01)

(52) U.S. Cl. .............................................. 2/69; 2/243.1
(58) Field of Classification Search ................... 2/243.1, 2/69, 455, 457, 400, 402, 79, 403, 901, 80, 2/51, 46; 428/916, 918
See application file for complete search history.

(56) References Cited

U.S. PATENT DOCUMENTS

| 2,959,789 A | 11/1960 | Mills et al. |
| 3,130,416 A | 4/1964 | Mitchell et al. |
| 3,200,427 A | 8/1965 | Daley |
| 3,586,596 A | 6/1971 | Ainsworth et al. |
| 3,744,534 A | 7/1973 | Henry et al. |
| 3,783,085 A | 1/1974 | Pearson et al. |

(Continued)

FOREIGN PATENT DOCUMENTS

DE 2951827 A1 7/1981

(Continued)

OTHER PUBLICATIONS

Advertisement for Scent Control Powder, Buckmasters's Whitetail Magazine, Nov. 1991, p. 75 (1 page).

(Continued)

*Primary Examiner* — Gloria Hale
(74) *Attorney, Agent, or Firm* — Foley & Lardner LLP

(57) ABSTRACT

An article of clothing adapted to be worn by a person has an odor absorbing substance incorporated therein. The odor absorbing substance absorbs odors emitting from that portion of the person which is substantially surrounded by the clothing. Reduction of odors emitting from a person wearing the article of clothing will help to avoid detection of the wearer of the article of clothing by many species of wildlife having an acute sense of smell.

74 Claims, 3 Drawing Sheets

U.S. PATENT DOCUMENTS

| | | | |
|---|---|---|---|
| 3,837,006 A | 9/1974 | Laseman | |
| 3,850,785 A | 11/1974 | McQuade et al. | |
| 3,852,897 A | 12/1974 | Bridge et al. | |
| 3,903,259 A | 9/1975 | Hart | |
| 3,920,020 A | 11/1975 | Kraskin | |
| 3,922,723 A | 12/1975 | Popper | |
| 3,959,556 A | 5/1976 | Morrison | |
| 4,045,609 A | 8/1977 | Hart | |
| 4,046,939 A | 9/1977 | Hart | |
| 4,067,210 A | 1/1978 | Arons et al. | |
| 4,099,342 A | 7/1978 | Singh | |
| 4,117,552 A | 10/1978 | Simpson | |
| 4,186,499 A | 2/1980 | Massok, Jr. et al. | |
| 4,186,502 A | 2/1980 | Foster | |
| 4,217,386 A | 8/1980 | Arons et al. | |
| 4,228,549 A | 10/1980 | Rispoli | |
| 4,244,059 A | 1/1981 | Pflaumer | |
| 4,285,068 A | 8/1981 | Ross | |
| 4,302,899 A | 12/1981 | DeHart | |
| 4,343,853 A | 8/1982 | Morrison | |
| 4,433,024 A | 2/1984 | Eian | |
| 4,454,191 A | 6/1984 | von Blücher et al. | |
| 4,455,187 A | 6/1984 | von Blücher et al. | |
| 4,460,708 A | 7/1984 | Stuetz | |
| 4,504,290 A | 3/1985 | Pontius | |
| 4,510,193 A * | 4/1985 | Blucher et al. | 428/196 |
| 4,515,761 A | 5/1985 | Plotzker | |
| 4,525,410 A | 6/1985 | Hagiwara et al. | |
| 4,539,982 A | 9/1985 | Bailly | |
| 4,565,727 A | 1/1986 | Giglia et al. | |
| 4,609,245 A | 9/1986 | Sakschek | |
| 4,617,230 A | 10/1986 | Shah et al. | |
| 4,663,780 A | 5/1987 | Rawlings et al. | |
| 4,677,019 A | 6/1987 | von Blücher | |
| 4,715,857 A | 12/1987 | Juhasz et al. | |
| 4,718,122 A * | 1/1988 | Steverson | 2/70 |
| 4,722,477 A | 2/1988 | Floyd | |
| 4,790,040 A | 12/1988 | Grilliot et al. | |
| 4,797,318 A | 1/1989 | Brooker et al. | |
| 4,817,594 A | 4/1989 | Juhasz | |
| 4,856,111 A | 8/1989 | Sholes | |
| 4,860,382 A | 8/1989 | Markwell | |
| 4,868,019 A * | 9/1989 | Knickerbocker | 428/17 |
| 4,872,220 A | 10/1989 | Haruvy et al. | |
| 4,874,129 A | 10/1989 | DiSapio et al. | |
| 4,883,021 A | 11/1989 | Ducharme et al. | |
| 4,901,370 A | 2/1990 | Suda | |
| 4,917,301 A | 4/1990 | Munteanu | |
| H823 H | 10/1990 | Conkle et al. | |
| 4,982,467 A | 1/1991 | Mizusawa et al. | |
| 5,002,183 A | 3/1991 | Okano | |
| 5,017,424 A | 5/1991 | Farnworth et al. | |
| 5,022,553 A | 6/1991 | Pontius | |
| 5,024,008 A | 6/1991 | Maples | |
| 5,042,088 A | 8/1991 | Sherrod et al. | |
| 5,085,914 A | 2/1992 | Perdelwitz, Jr. et al. | |
| 5,088,116 A * | 2/1992 | Gould | 2/82 |
| 5,092,008 A | 3/1992 | Okubo | |
| 5,103,500 A | 4/1992 | Nager et al. | |
| 5,112,666 A | 5/1992 | Langston | |
| 5,117,821 A | 6/1992 | White | |
| 5,129,735 A | 7/1992 | Neal et al. | |
| 5,154,960 A | 10/1992 | Mucci et al. | |
| 5,159,718 A * | 11/1992 | Moyer | 2/69 |
| 5,161,686 A | 11/1992 | Weber et al. | |
| 5,165,964 A | 11/1992 | Imai | |
| 5,183,656 A | 2/1993 | Uesaka et al. | |
| 5,383,236 A | 1/1995 | Sesselmann | |
| 5,445,863 A * | 8/1995 | Slagle et al. | 428/156 |
| 5,539,930 A | 7/1996 | Sesselmann | |
| 5,678,247 A | 10/1997 | Vickers | |
| 5,790,987 A | 8/1998 | Sesselmann | |
| 6,009,559 A | 1/2000 | Sesselmann | |
| 6,134,718 A | 10/2000 | Sesselmann | |

FOREIGN PATENT DOCUMENTS

| | | |
|---|---|---|
| DE | 3304349 A1 | 8/1984 |
| DE | 3924034 A1 | 1/1991 |
| DE | 4003765 A1 | 8/1991 |
| EP | 0099758 | 2/1984 |
| EP | 0118618 B1 | 11/1986 |
| EP | 0144553 B1 | 11/1987 |
| EP | 0260841 A1 | 3/1988 |
| EP | 0053936 | 4/1989 |
| GB | 1173143 | 10/1969 |
| GB | 1301101 | 12/1972 |
| GB | 2067095 A | 7/1981 |
| GB | 2127389 | 4/1984 |
| GB | 2207390 A | 2/1989 |
| WO | WO 97/46878 | 12/1997 |

OTHER PUBLICATIONS

Declaration of Gregory J. Sesselmann, dated Apr. 3, 2003.

Notice of Litigation Involving Subject Matter for Which a Patent is Being Sought.

Winfield Manufacturing Company, "Technical Bulletin SAr-1: Saratoga in CD Protective Clothing," Winfield Saratoga, Oct. 1984.

Winfield Manufacturing Company, "Technical Bulletin SAr-3: Chemicla Protective PBI Saratoga CWU/66P Air Force Flight Coverall," Winfield Saratoga, Jun. 1989.

Alexandroff et al., "PBI Saratoga: New and Improved CWU/66P Chemical Protective Clothing System for Aircrew Application" (undated).

Gary Tate's Chemical Warfare Equipment Page, http://www.seanet.com/~gtate/cwappar.htm (printed Nov. 17, 1999).

Eugene E. Alexandroff, "Saratoga: Carbon Pellet Technology in Chemical Warfare Protective Fabrics," Proc. $2^{nd}$ Int. Symp. Protection Against Chemical Warfare Agents, Jun. 15-19, 1986, pp. 67-76, Stockholm, Sweden.

Derek Griffiths, "The Mark IV: State-of-the-Art in British NBC Protection," Nuclear, Biological and Chemical Defense and Technology International, 1987, pp. 37-40, vol. 2, No. 1, NBC Defense International Ltd., New York, NY.

David Hughes, "USAF May Speed Production of New Suits to Protect Crews from Chemical Weapons," Aviation Week & Space Technology, Aug. 20, 1990, pp. 27-_.

"Charcoal Cloth Comes of Age for Body Protection," The ASA Newsletter, Apr. 3, 1992, p. 13, Issue No. 29 (Ed. Colonel Richard Price).

"British Breakthrough—Garfil Nonwovens," Nonwovens Industry, Apr. 1984, pp. 10-14, vol. 15, No. 4, Rodman Publications, Inc., Ramsey, NJ.

Eugene E. Alexandroff, "Saratoga: A New Dimension in CB Protective Clothing," Nuclear, Biological, and Chemical Defense Technology, May 1986, pp. 43-46, vol. 1, No. 2.

Kim et al., "Development of Improved Permeable and Impermeable Material for Chemical Protective Clothing," 88 pgs., Jun. 1985, Celanese Research Company, Summit, New Jersey.

Military Specification—Cloth, Twill, Camouflage Pattern, Cotton and Nylon for Desert Uniform, MIL-C-44034C, Mar. 28, 1986.

Military Specification—Suit, Chemical Protective, MIL-S-43926H, Mar. 25, 1988.

Military Specification—Suit, Chemical Protective, MIL-S-43926J, Aug. 30, 1991.

Military Specification—Cloth, Camouflage Pattern: Woodland, Cotton and Nylon, MIL-C-44031, Sep. 26, 1980.

Military Specification—Cloth, Laminated, Nylon Tricot Knit, Polyurethane Foam Laminate, Chemical Protective and Flame Resistant, MIL-C-43858 (GL), Jan. 16, 1986.

Blücher, "Status of Today—May 1991" (undated).

Bluecher, "Saratoga™ by Bluecher: Saratogo—Philosophy" (undated).

Gilbert et al., "Activated Carbon Fabric Prepared by Pyrolysis and Activation of Phenolic Fabric," Textile Research Journal, Jan. 1975, p. 91, vol. 45, No. 1, Textile Research Institute, Princeton, New Jersey.

Arons et al., "Sorptive Textile Systems Containing Activated Carbon Fibers," Textile Research Journal, Nov. 1974, pp. 874-883, vol. 44, No. 11, Textile Research Institute, Princeton, New Jersey.

Arons et al., "Sorption Characteristics of Activated Carbon Fabric," Textile Research Journal, Sep. 1973, pp. 539-543, vol. 43, No. 9, Textile Research Institute, Princeton, New Jersey.

Arons et al., "Activated Carbon Fiber and Fabric Achieved by Pyrolysis and Activation of Phenolic Precursors," Textile Research Journal, Jan. 1972, pp. 60-63, vol. 42, No. 1., Textile Research Institute, Princeton, New Jersey.

OdorGard, "Disappearing Act," Buck Masters (dated at least as early as Jan. 3, 1992) (Advertisement).

Hunter's Edge Outfitters, "The Hunter's Edge Story," 2 pgs. (dated at least as early as Mar. 28, 1994).

"Hunter's Edge Markets Scent-Absorbing Suit," Sunday Montgomery Advertiser, Dec. 6, 1992, Business Section, Montgomery, Alabama.

Original Scent Shield, http://www.bowhunting.net/scentshield, Robinson Laboratories, Inc. (print date unknown).

Chemical Warfare Defense Handbook, Nov. 1989.

First Office Action in Reexamination of U.S. Appl. No. 5,539,930.

Jim Dawson, "Whitetail Hunting," 1982, p. 87, Stackpole Books, Harrisburg (3 pgs. total).

"Outdoor Life Deer Hunter's Yearbook," 1989, p. 28, Popular Science Books, New York (3 pgs. total).

Request for Reexamination of U.S. Patent No. 5,539,930.

Dawson, Jim; *Whitetail Hunting*; 1982; cover page, copyright page, pp. 20-22, 86-88, 95-97; Stackpole Books, Harrisburg, PA.

Miller, Greg, "Bucks and B.O.," *Outdoor Life Deer Hunter's Yearbook*, 1990, cover and pp. 25-30.

Clinton, Brad, 37 C.F.R. Sec. 1,132 Declaration, Oct. 29, 1995, 3 pages.

Edberg, Keith, Declaration, Mar. 22, 2007, 5 pages.

Edberg, Keith, Supplemental Declaration, Sep. 23, 2008, 28 pages.

Etling, Kathy, 37 C.F.R. Sec. 1,132 Declaration, Nov. 4, 1993, 3 pages.

Geurink, Denny, 37 C.F.R. Sec. 1,132 Declaration, Oct. 21, 1993, 2 pages.

Hill, James C., 37 C.F.R. Sec. 1,132 Declaration, Jan. 12, 1993, 3 pages.

Hill, Jim, Declaration, Mar. 22, 2007, 4 pages.

Hill, Jim, Supplemental Declaration, Sep. 22, 2008, 6 pages.

Love, John David, 37 C.F.R. Sec. 1,132 Declaration, Jan. 13, 1992, 3 pages.

Paquin, Greg, Declaration, Mar. 22, 2007, 158 pages.

Tarrell, Everett, Declaration, May 22, 2006, 4 pages.

*A.L.S. Enterprises, Inc.*, Decision on Appeal, United States Patent and Trademark Office, Board of Patent Appeals, Appeal 2009-014648, Mar. 29, 2010, 59 pages.

* cited by examiner

ODOR ABSORBING ARTICLE OF CLOTHING

RELATED U.S. APPLICATION DATA

This application is a continuation of application Ser. No. 10/050,203 filed Jan. 16, 2002, which is a continuation of application Ser. No. 09/893,030 filed Jun. 27, 2001, now abandoned, which is a continuation of application Ser. No. 09/621,442 filed Jul. 21, 2000, now abandoned, which is a continuation of application Ser. No. 09/365,364 filed Jul. 30, 1999, now U.S. Pat. No. 6,134,718, which is a continuation of application Ser. No. 09/127,162 filed Jul. 31, 1998, now U.S. Pat. No. 6,009,559, which is a continuation of application Ser. No. 08/685,820 filed Jul. 25, 1996, now U.S. Pat. No. 5,790,987, which is a continuation of application Ser. No. 08/373,588 filed Jan. 17, 1995, now U.S. Pat. No. 5,539,930 which is a continuation of application Ser. No. 08/125,342 filed Sep. 22, 1993, now U.S. Pat. No. 5,383,236, which is a continuation of application Ser. No. 07/798,288 filed Nov. 25, 1991, now abandoned.

BACKGROUND OF THE INVENTION

1. Field of the Invention

This invention relates to odor absorbing clothing and, more particularly, to an article of clothing incorporating an odor absorbing substance. The odor absorbing substance is adapted to absorb odors emanating from the wearer and thereby reduce the chance that wildlife with an acute sense of smell will detect the wearer of the article.

2. Description of the Related Art

It is an unavoidable occurrence that humans emanate odors. The odors may originate from numerous sources including natural bodily secretions such as perspiration, oils, and the like; halitosis; colognes, perfumes, scented soaps, deodorants, shampoos, and the like; clothing worn by the individual; and odors that are absorbed by the individual's clothing and subsequently released to the surrounding environment. That a person emanates odors is not necessarily reflective of his personal hygiene but is simply an unassailable fact of human existence.

Numerous cosmetic and health care products have been developed to mask the more unpleasant odors. Colognes, perfumes, scented soaps, deodorants and the like which are employed for such purposes do nothing more than mask the undesirable odor and replace it with one that is considered more pleasing. In certain situations, however, it is desirable to provide an odorless or scentless presence. For example, certain people must have the ability to approach wild game in close proximity. Such persons include hunters, naturalists, wildlife photographers, wildlife biologists, wildlife political activists, and law-enforcement personnel charged with the responsibility of protecting wild game from injury, poaching and the like.

It is well known that wild game have a keenly developed sense of smell that can readily distinguish odors that are not indigenous to their natural habitat. Such odors may include those emanating from humans who attempt to gain close proximity to the game. Perfumes, scented soaps, and colognes may mask odors but are themselves readily detected by the wild game, perhaps at even greater distances. Such scents are not natural to the animals and therefore they are either scared away or alerted to the presence of potential danger.

One attempt to mask these odors is found in hunter's aids in the form of sponge-like pads that can be repeatedly impregnated with an artificially or naturally based aromatic scent such as deer lure. Examples of such devices are disclosed in U.S. Pat. No. 4,186,502, issued Feb. 5, 1982 to L. Foster and U.S. Pat. No. 4,302,899, issued Dec. 1, 1981 to G. DeHart. These devices function by distributing a scent that wild game find attractive but they do nothing to mask or absorb the odors emanating from the person. With time, the attractive powers of the lure diminish thereby decreasing its effectiveness. Moreover, the wild game may sense both the attractant and the odors emanating from the person. These prior devices are not acceptable because they do nothing to eliminate the scents indigenous to humans.

There has been a long-felt need for some device that is adapted to readily, efficiently and effectively absorb human odors such that a user presents a virtually odorless or scentless appearance, thereby enabling one to approach wild game in close proximity.

SUMMARY OF THE INVENTION

In one embodiment, the invention is directed to an article of clothing adapted to cover at least a portion of body, preferably at least one of the torso, the waist or the head of a person wearing the article. The article of clothing is air permeable and incorporates an odor absorbing substance. This odor absorbing substance is susceptible to reactivation through the act of washing and drying the article of clothing. Preferably, the article of clothing incorporates either a bright, highly visible color scheme such as hunter's orange or alternatively incorporates a camouflage color scheme on an exterior surface of the article of clothing. This article of clothing absorbs at least a portion of the odor emitted from the wearer of the article of clothing thereby reducing the chances of wildlife detecting the wearer through the sense of smell.

In a preferred embodiment, the odor absorbing substance utilized is activated charcoal. This charcoal can be in the range of 5 g/m$^2$ to 120 g/m$^2$.

In another embodiment, the article of clothing is either water repellant or water resistant. Further, the article of clothing can comprise any number of different articles of clothing including a coat, a shirt, a one-piece bodysuit, a mask, a hat or a pair of pants.

In still another embodiment, the invention comprises a system for reducing detection of wildlife through the sense of smell comprising a first and a second article of clothing. The first article of clothing is adapted to cover at least one of the torso region or the groin region of the person wearing the article of clothing. The first article is air permeable and incorporates an odor absorbing substance in an amount sufficient to reduce the naturally occurring body odors of the person wearing the article of clothing. The second article of clothing is air permeable and also incorporates an odor absorbing substance in an amount sufficient to reduce the naturally occurring body odors of the person wearing the article of clothing. In this embodiment, the activated charcoal of the first and second articles of clothing, when worn by an individual, combine to reduce the odors emitting from the wearer and thereby reduce the chance of detection of the wearer by wildlife having an acute sense of smell.

In one embodiment, the second article of clothing comprises a mask. In yet another embodiment, the second article of clothing comprises a pair of socks. In still yet another embodiment, the second article of clothing comprises a hat. In another embodiment, the second article of clothing comprises a pair of gloves. Alternatively, in another embodiment the second article of clothing comprises a pair of pants.

Preferably, both the first and second article of clothing are air permeable. In one embodiment at least one of the first and second article of clothing is water repellant. In yet another embodiment, a camouflage color scheme is provided on at least one of the first and second articles of clothing.

Still yet another embodiment of the invention comprises an article of clothing adapted to cover the torso region of a person wearing the article of clothing. This article of clothing is air permeable and incorporates activated charcoal in an amount sufficient to reduce the wearer's naturally occurring body odors. This reduces the chances of wildlife detecting the wearer through the sense of smell.

In a preferred embodiment, this article of clothing has a camouflage color scheme provided thereon. The article of clothing can also be either water repellant or water resistant.

In yet another embodiment, the article of clothing is adapted to also cover the groin region of the wearer. Alternatively, the article of clothing can be adapted to cover at least a portion of the head of the wearer.

In one embodiment, the activated charcoal is incorporated into a base layer of the article of clothing intermediate the inner and outer surfaces of the base layer. In an alternative embodiment, the activated charcoal is provided on the outer surface of a base layer. In still yet another alternative embodiment, the article of clothing is formed from an outer layer and a base layer and the activated charcoal is provided intermediate the inner surface of the base layer and the outer surface of the outer layer of the article of clothing.

Preferably, the article of clothing is adapted to be worn as the outer most layer of clothing of the wearer. In one embodiment this article of clothing comprises a coat. In another embodiment this article of clothing comprises a one-piece bodysuit.

BRIEF DESCRIPTION OF THE DRAWINGS

The invention will now be described with reference to the drawings in which.

DESCRIPTION OF THE PREFERRED EMBODIMENT

Figure 1:
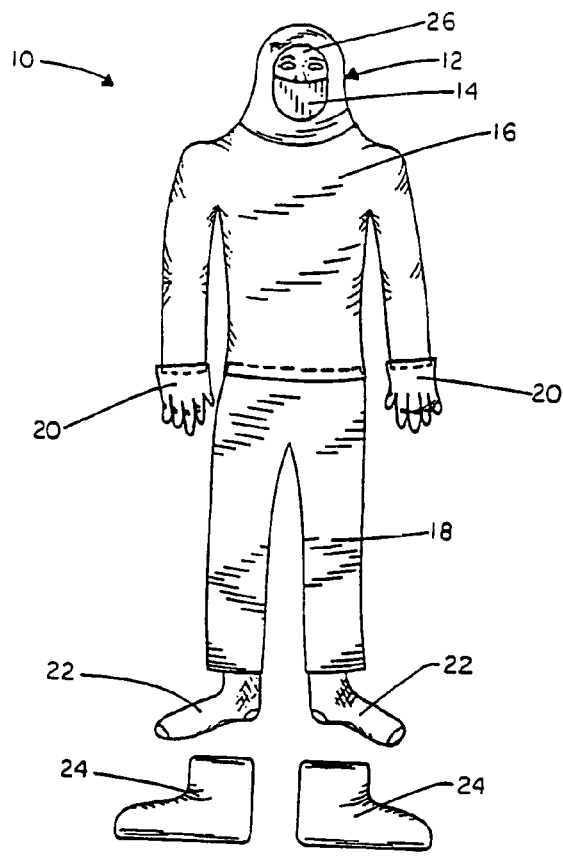
FIG. 1 is an elevational view of a person shown in conjunction with several articles of clothing in partially exploded array and constructed in accordance with the invention.
Figure 6:
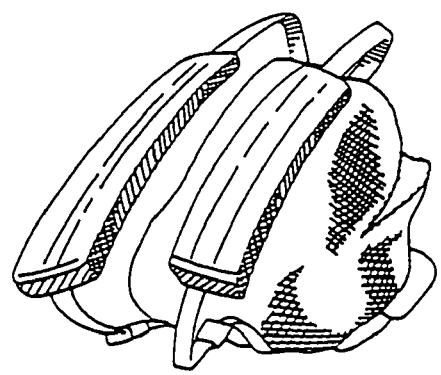
FIG. 6 is a perspective view of a backpack in accordance with the invention.
Figure 7:
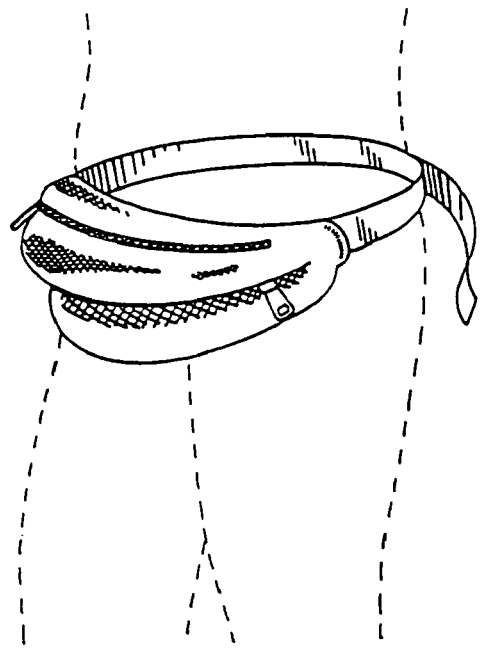
FIG. 7 is a perspective view of a fanny pack in accordance with the invention.

Turning now to the drawings and in particular to FIG. 1, a person 10 is shown in conjunction with several articles of clothing, each of which, as explained more fully below, when constructed in accordance with the invention is adapted to absorb odors emanating from the person. The particular articles of clothing illustrated in FIG. 1 include a head covering 12, a breath shield 14, an upper body or torso cover 16, a lower body cover 18, gloves or mittens 20, foot covers or socks 22, and boot or shoe covers 24. Similarly, articles such as backpacks 50 (FIG. 6), fanny packs 52 (FIG. 7) and the like may incorporate odor absorbing means to absorb the odors of the materials stored therein.

The head covering 12 is adapted to substantially cover the entire head of the person 10 as well as the neck region. Preferably, an open portion 26 is provided in order that the person 10 may see. The breath shield 14 may be incorporated directly into the head covering 12 by stitching or adhesive bonding or may be in the form of a separate article of clothing similar to surgical masks and the like employed by physicians.

The upper body cover 16 is adapted to cover the torso and waist regions of the person 10 as well as the arms and shoulders. Similarly, the lower body cover 18 is adapted to cover the waist and pelvic regions 10 as well as the legs. The upper and lower body covers 16, 18 may comprise individual articles of clothing that overlap in the area of the waist or may be in the form of a one-piece body suit.

The gloves or mittens 20 may be worn over the hands and preferably overlap those portions of the upper body cover 16 that envelop the arms of the wearer. Similarly, the socks may be worn over the feet of the individual 10 and function as foot covers. Finally, the boot or shoe covers 24 commonly known as "gators" may be adapted to be worn over clad feet and may be provided with heels, soles or the like if desired.

The individual articles of clothing may be sized to conform to the person wearing the clothing although it is preferred that they be made large enough to be capable of being worn comfortably by a person dressed in otherwise conventional clothing. The individual articles of clothing may be thermally insulated or made water-repellent or water-resistant if desired although this is not required to successfully practice the invention. Similarly, the articles of clothing may be provided with an appropriate camouflaging color scheme so that the person 10 wearing clothing constructed according to the invention may blend more readily into the surrounding environment. Alternatively, it may be desired to provide the articles of clothing with a bright and highly visible color so that the person 10 will be easily observable by other people such as hunters.

Figure 2:
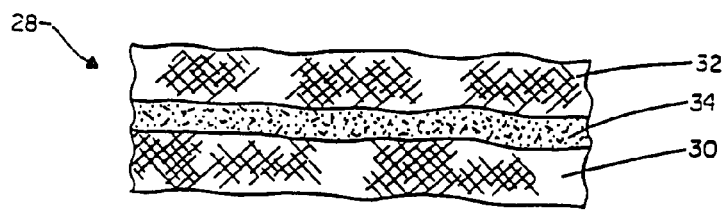
FIG. 2 is a cross-sectional view through an article of clothing constructed in accordance with the invention, showing the construction thereof in greater detail.
Figure 3:
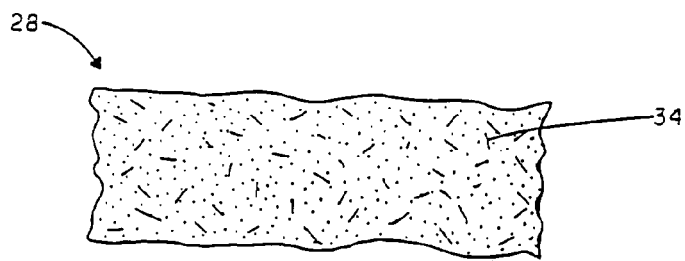
FIG. 3 is a cross-sectional view through an article of clothing having a first alternative construction in accordance with the invention.
Figure 4:
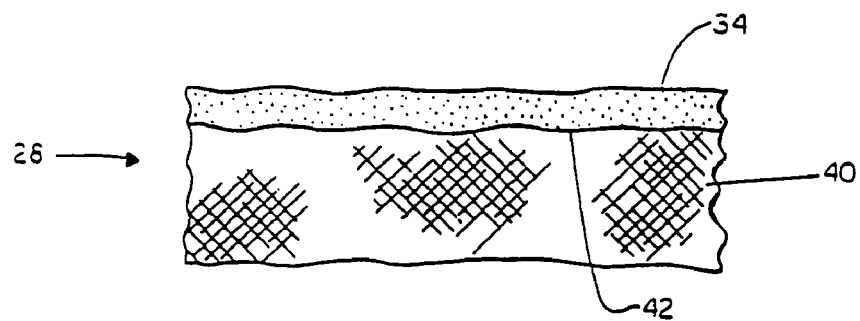
FIG. 4 is a cross-sectional view through an article of clothing having a second alternative construction 10 in accordance with the invention.
Figure 8:
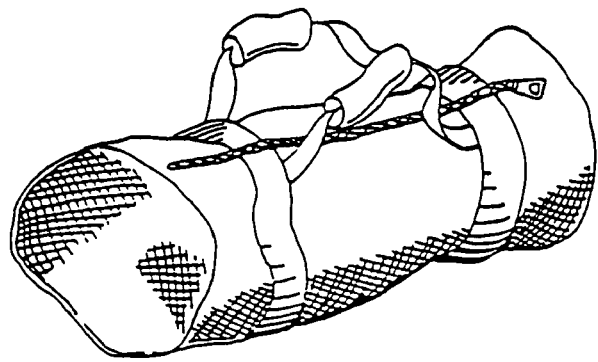
FIG. 8 is a perspective view of a duffel bag in accordance with the invention.

Each of the articles of clothing identified above has a substantially similar construction in cross section, which construction is shown in greater detail in FIGS. 2-4. To assist the description hereinafter, the reference numeral 28 in FIGS. 2-4 identifies an article of clothing generally. It will be understood that the article of clothing identified generally in FIGS. 2-4 by the reference numeral 28 may comprise any of the articles of clothing described hereinabove including the head covering 12, the breath shield 14, the upper body cover 16, the lower body cover 18, the gloves, mittens or hand covers 20, the socks or foot covers 22, the boot or shoe covers 24, or a duffle or knapsack 56 (FIG. 8).

In the embodiment illustrated in FIG. 2, the article of clothing 28 comprises an inner layer 30 and an outer layer 32 having enclosed there between means 34 for absorbing odors of the wearer. The odor absorbing means 34 may be in the form of fibers treated with or having incorporated therein activated carbon or charcoal. A suitable example of such odor absorbing means is commercially marketed under the name Garfil-615 by Purification Products Ltd. of Great Britain and distributed in the United States by FILTEREX, Inc. of Shippensburg, Pennsylvania. Preferably, the amount of activated charcoal is in the range of 5 g/m² to 120 g/m². Alternatively, the odor absorbing means could be in the form of chlorophyll, baking soda, activated alumina, soda lime, zeolite, calcium oxide, potassium permanganate or a similar substance. As used herein, the term "absorb" and its cognates (e.g., absorbed, absorbing, and absorption) refers generically to the action of absorption and of adsorption for the means identified in this paragraph.

The inner and outer layers 30, 32 of the clothing article 28 may be similar or dissimilar and may comprise cotton, polypropylene, wool, felt, polyester, TYVEK® or GORE-TEX®, a laminate comprising polytetrafluoroethylene bonded to a suitable fabric and commercially marketed by W. L. Gore & Associates, Inc., Newark, Del. The various materials for the inner and outer layers 30, 32 may be, non-woven, closely woven, comprise a fine mesh or be fabricated in some other suitable manner. The inner and outer layers 30, 32 may be secured to each other by stitching, quilting, needling or adhesive bonding at appropriate and conventional locations (not shown separately In the drawings) such as seams.

In one embodiment, the inner and outer layers 30, 32 may be in the form of a needled, non-woven polyester fabric, each layer having a weight of approximately 10 to 12 oz./sq. yd. and a thickness of approximately 1/16". The odor absorbing means may be provided by a layer of Garfil 615 having a weight of approximately 10-12 oz./sq. yd.

Alternatively, as best shown in FIG. 3, the article of clothing 28 may be in the form of a foam of latex or other polymer 36 that has been impregnated with the odor absorbing means 34, such as activated charcoal. Whatever materials are selected for the ultimate construction of the article of clothing 28, the article should preferably be durable, flexible, abrasion resistant, easy to manufacture, nontoxic, nonflammable, and capable of carrying or retaining substantial amounts of the appropriate odor absorbing means 34.

A further embodiment of the article of clothing is seen in FIG. 4. In this embodiment, a base material 40 has a layer of odor absorbing means 34 bonded to a first surface 42. Preferably, the layer of odor absorbing means 34 is mounted on the outer surface of the base material, although mounting the odor absorbing means on the inner surface of the base material is acceptable. The odor absorbing means 34 may be mounted on the base material 40 by a "printing" process wherein the odor absorbing substance, such as activated charcoal, is mixed with a bonding agent and then printed on the base material 40 by a silk-screen printing process. An example of this process is disclosed in U.S. Pat. No. 4,510,193 to Blucher et al., issued Apr. 9, 1985.

The person 10 may choose to wear some or all of the articles of clothing described above and illustrated in FIG. 1. The degree of odor absorption increases as the surface area of the body of the person 10 covered by the articles of clothing increases. Thus, the most effective odor absorbing arrangement will comprise the head covering 12, the breath shield 14, the upper body cover 16, the lower body cover 18, the gloves or mittens 20, the socks or foot covers 22, and the boot or shoe covers 24. Although effective odor absorption may be realized by wearing only some of the articles of clothing, the person 10 will preferably wear all of the articles of clothing described above to provide a more-or-less total-coverage body suit.

Figure 5:
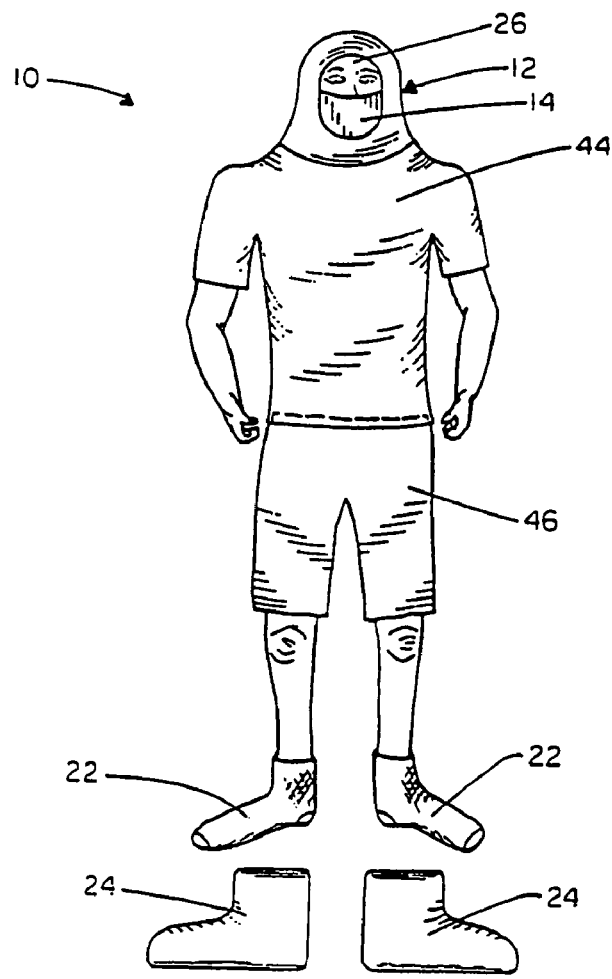
FIG. 5 is an elevational view of a person shown in conjunction with several articles of clothing constructed in accordance with the invention.

In warm weather climates, it may be desirable to cover only a portion of the person 10. FIG. 5 shows an alternative embodiment of the suit according to the invention. In this embodiment, the person 10 wears an upper body cover 44 and a lower body cover 46. The upper body 44 cover is analogous to a short-sleeve shirt wherein the person's chest, torso, shoulders and underarms are covered. The lower body cover 46 comprises a pair of shorts which cover the pelvic or groin region and a portion of the legs of the person 10. The embodiment seen in FIG. 5 may be enhanced by adding one or more of the head covering 12, the breath shield 14, the gloves 20, the foot covers 22 or the shoe covers 24.

It may be desirable to provide additional odor absorbing means 34 for those articles of clothing adjacent to body parts that are more likely to emanate readily detectable odors such as the underarms and pelvic regions. In this case, an enhanced layer of the odor absorbing means can be mounted to the article of clothing 28 in the underarm or pelvic regions. For example, two layers of activated charcoal in the amount of 50 $g/m^2$ may be mounted one on top of the other to create a total of 100 $g/m^2$ for enhanced odor absorption in one or more sensitive areas.

The articles of clothing according to the invention may be worn as an outer layer of clothing, as an inner layer, or intermediate outer and inner layers of otherwise conventional clothing.

It has been found that activated charcoal used as the odor absorbing means 34 may be reactivated for numerous cycles of use. This reactivation can occur merely by washing and drying the article of clothing 28. Washing and drying helps to remove impurities and foreign articles bonded to the activated charcoal.

Reasonable variations or modifications are possible within the spirit of the foregoing specification and drawings without departing from the scope of the invention which is defined in the accompanying claims.

The embodiments of the invention in which an exclusive property or privilege is claimed are defined as follows:

1. An article of clothing adapted to cover at least a portion of at least one of the torso, the waist and the head of a person wearing said article of clothing, the article being air permeable and comprising:
   activated charcoal incorporated into the article of clothing wherein the activated charcoal is susceptible to reactivation through the act of washing and drying the article of clothing;
   at least one of a bright, highly visible color scheme and camouflage color scheme provided on an exterior surface of said article of clothing; and
   the article of clothing being abrasion resistant;
   whereby the activated charcoal absorbs at least a portion of the odors emanating from the wearer of said article of clothing thereby reducing the chances of wildlife detecting the wearer through the sense of smell.

2. An article of clothing according to claim 1 wherein the activated charcoal is in the range of 5 $g/m^2$ to 120 $g/m^2$.

3. An article of clothing according to claim 1 wherein the article of clothing is water repellant.

4. An article of clothing according to claim 1 wherein the article of clothing is water resistant.

5. An article of clothing according to claim 1 wherein the article of clothing is thermally insulated.

6. An article of clothing according to claim 1 wherein said article of clothing comprises a coat.

7. An article of clothing according to claim 1 wherein said article of clothing comprises a one-piece body suit.

8. An article of clothing according to claim 1 wherein said article of clothing comprises a mask.

9. An article of clothing according to claim 1 wherein said article of clothing comprises a hat.

10. An article of clothing according to claim 1 wherein said article of clothing comprises a shirt.

11. An article of clothing according to claim 1 wherein said article of clothing comprises a pair of pants.

12. An article of clothing according to claim 1 wherein the article of clothing comprises a base layer and the activated charcoal is impregnated into the base layer.

13. An article of clothing according to claim 1 wherein the article of clothing comprises a base layer and the activated charcoal is bonded to the base layer.

14. An article of clothing according to claim 1, wherein the article of clothing is nontoxic.

15. An article of clothing according to claim 1, wherein the article of clothing is nonflammable.

16. A system for reducing human odors while hunting wildlife comprising:
   a first article of clothing adapted to cover one of the torso region and groin region of a person wearing said article of clothing, said first article of clothing being air permeable and incorporating activated charcoal in an amount sufficient to reduce the naturally occurring body odors of a person wearing said article of clothing; and
   a second article of clothing being air permeable and incorporating activated charcoal in an amount sufficient to reduce the naturally occurring body odors of a person wearing said article of clothing;
   wherein the activated charcoal of the first and second articles of clothing, when worn by an individual, combine to reduce the odors emanating from the wearer in an amount sufficient to reduce the chance of detection of the wearer by wildlife having an acute sense of smell thereby permitting the wearer to be in close proximity to the wildlife.

17. A system for reducing human odors according to claim 16 wherein the second article of clothing comprises a mask.

18. A system for reducing human odors according to claim 16 wherein the second article of clothing comprises a pair of socks.

19. A system for reducing human odors according to claim 16 where the second article of clothing comprises a hat.

20. A system for reducing human odors according to claim 16 where the second article of clothing comprises a pair of gloves.

21. A system for reducing human odors according to claim 16 where the second article of clothing comprises a pair of pants.

22. A system for reducing human odors according to claim 16 and wherein said first and second articles of clothing are air permeable.

23. A system for reducing human odors according to claim 16 wherein at least one of said first and second articles of clothing is water repellant.

24. A system for reducing human odors according to claim 16 and further comprising a camouflage color scheme provided on at least one of the first and second articles of clothing.

25. A system for reducing human odors according to claim 16 wherein at least one of said first and second articles of clothing is adapted to cover the pelvic regions of a person wearing the said first and second articles of clothing.

26. A system for reducing human odors according to claim 16 wherein at least one of said first and second articles of clothing is adapted to cover at least a portion of the face of a person wearing said first and second articles of clothing.

27. A system for reducing human odors according to claim 16 wherein at least one of said first and second articles of clothing is thermally insulated.

28. A system for reducing human odors according to claim 16 wherein the activated charcoal is impregnated in said at least one of the first and second articles of clothing.

29. A system for reducing human odors according to claim 16 wherein the activated charcoal is bonded to said at least one of the first and second articles of clothing.

30. A system for reducing human odors according to claim 16 wherein the activated charcoal is susceptible to reactivation through the act of dr in .

31. A system for reducing human odors according to claim 16 wherein the activated charcoal is susceptible to reactivation through the act of washing and drying.

32. A system for reducing human odors according to claim 16 wherein at least one of said first and second articles of clothing is a shirt.

33. A system for reducing human odors according to claim 16, wherein at least one of the first and second articles is abrasion resistant.

34. A system for reducing human odors according to claim 16, wherein at least one of the first and second articles is nontoxic.

35. A system for reducing human odors according to claim 16, wherein at least one of the first and second articles is nonflammable.

36. An article of clothing adapted to be worn while hunting wildlife and to cover at least a portion of at least one of the torso, the waist and the head of a person wearing said article of clothing, the article being air permeable and comprising:
   activated charcoal incorporated into the article of clothing wherein the activated charcoal is susceptible to reactivation through the act of drying the article of clothing;
   at least one of a bright, highly visible color scheme and camouflage color scheme provided on an exterior surface of said article of clothing; and
   the article of clothing being abrasion resistant;
   whereby the activated charcoal absorbs a sufficient amount of the odors emanating from the wearer of said article of clothing so that the wearer may be in close proximity to the wildlife without the wildlife detecting the wearer through the sense of smell.

37. An article of clothing according to claim 36 wherein the activated charcoal is in the range of 5 $g/m^2$ to 120 $g/m^2$.

38. An article of clothing according to claim 36 wherein the article of clothing is water repellant.

39. An article of clothing according to claim 36 wherein the article of clothing is water resistant.

40. An article of clothing according to claim 36 wherein the article of clothing is thermally insulated.

41. An article of clothing according to claim 36 wherein said article of clothing comprises a coat.

42. An article of clothing according to claim 36 wherein said article of clothing comprises a one-piece body suit.

43. An article of clothing according to claim 36 wherein said article of clothing comprises a mask.

44. An article of clothing according to claim 36 wherein said article of clothing comprises a hat.

45. An article of clothing according to claim 36 wherein said article of clothing comprises a shirt.

46. An article of clothing according to claim 36 wherein said article of clothing comprises a pair of pants.

47. An article of clothing according to claim 36 wherein the article of clothing comprises a base layer and the activated charcoal is impregnated into the base layer.

48. An article of clothing according to claim 36 wherein the article of clothing comprises a base layer and the activated charcoal is bonded to the base layer.

49. An article of clothing according to claim 36 wherein the activated charcoal is susceptible to reactivation through the act of washing and drying the article of clothing.

50. An article of clothing according to claim 36, wherein the article of clothing is nontoxic.

51. An article of clothing according to claim 36, wherein the article of clothing is nonflammable.

52. A system for reducing human odors while hunting wildlife comprising:
- a first article of clothing adapted to cover one of the torso region and groin region of a person wearing the first article of clothing,
  - the first article of clothing being air permeable and incorporating activated charcoal in an amount sufficient to reduce the naturally occurring body odors of a person wearing said article of clothing,
  - the activated charcoal being susceptible to reactivation through the act of washing and drying the first article of clothing, and
  - at least one of a bright, highly visible color scheme and camouflage color scheme provided on an exterior surface of said first article of clothing; and
- a second article of clothing being air permeable and incorporating activated charcoal in an amount sufficient to reduce the naturally occurring body odors of a person wearing said second article of clothing;
- wherein the activated charcoal of the first and second articles of clothing, when worn by an individual, combine to reduce the odors emanating from the wearer in an amount sufficient to reduce the chance of detection of the wearer by wildlife having an acute sense of smell thereby permitting the wearer to be in close proximity to the wildlife.

53. A system for reducing human odors according to claim 52, wherein the first article of clothing comprises an upper body cover, wherein the second article of clothing comprises a lower body cover, and wherein portions of one of the first and second articles of clothing are designed to overlap portions of the other of the first and second articles of clothing.

54. A system for reducing human odors according to claim 53, wherein the portions of the first and second articles of cloth overlap in the area of a waist.

55. A system for reducing human odors according to claim 53, further comprising a third article of clothing being air permeable and incorporating activated charcoal in an amount sufficient to reduce the naturally occurring body odors of a person wearing said third article of clothing, the third article comprising at least one of gloves and mittens, and wherein portions of the third article are designed to overlap other portions of the first article.

56. A system for reducing human odors according to claim 55, wherein the first, second, and third articles of clothing are abrasion resistant.

57. A system for reducing human odors according to claim 56, wherein the first, second, and third articles of clothing are nontoxic.

58. A system for reducing human odors according to claim 57, wherein the first, second, and third articles of clothing are nonflammable.

59. A system for reducing human odors according to claim 58, further comprising a fourth article of clothing being air permeable and incorporating activated charcoal in an amount sufficient to reduce the naturally occurring body odors of a person wearing said fourth article of clothing, the fourth article comprising a head covering adapted to substantially cover a head and neck region of a person, and including an open portion thereof provided to allow the person to see therethrough.

60. An article of clothing adapted to cover at least a portion of at least one of the torso, the waist and the head of a person wearing said article of clothing, the article being air permeable and comprising:
- activated charcoal incorporated into the article of clothing, whereby the activated charcoal absorbs at least a portion of the odors emanating from the wearer of said article of clothing thereby reducing the chances of wildlife detecting the wearer through the sense of smell;
- wherein the activated charcoal is susceptible to reactivation through the act of washing and drying the article of clothing;
- wherein the article of clothing comprises a base layer and the activated charcoal is impregnated into the base layer;
- at least one of a bright, highly visible color scheme and camouflage color scheme provided on an exterior surface of said article of clothing; and
- wherein the article of clothing is thermally insulated.

61. An article of clothing according to claim 60 wherein the activated charcoal is in the range of 5 $g/m^2$ to 120 $g/m^2$.

62. An article of clothing according to claim 60 wherein the article of clothing is water repellant.

63. An article of clothing according to claim 60 wherein the article of clothing is water resistant.

64. An article of clothing according to claim 60 wherein said article of clothing comprises a coat.

65. An article of clothing according to claim 60 wherein said article of clothing comprises a one-piece body suit.

66. An article of clothing according to claim 60 wherein said article of clothing comprises a mask.

67. An article of clothing according to claim 60 wherein said article of clothing comprises a hat.

68. An article of clothing according to claim 60 wherein said article of clothing comprises a shirt.

69. An article of clothing according to claim 60 wherein said article of clothing comprises a pair of pants.

70. An article of clothing according to claim 60, wherein the article of clothing is abrasion resistant.

71. An article of clothing according to claim 70, wherein the article of clothing is nontoxic.

72. An article of clothing according to claim 71, wherein the article of clothing is nonflammable.

73. An article of clothing according to claim 72, wherein the article comprises a head covering adapted to substantially cover a head and neck region of a person, and including an open portion thereof provided to allow the person to see therethrough.

74. An article of clothing according to claim 73, wherein the article further comprises a breath shield incorporated directly into the head covering.

* * * * *

UNITED STATES PATENT AND TRADEMARK OFFICE
CERTIFICATE OF CORRECTION

PATENT NO. : 8,069,496 B2  Page 1 of 1
APPLICATION NO. : 10/713686
DATED : December 6, 2011
INVENTOR(S) : Gregory J. Sesselmann It is certified that error appears in the above-identified patent and that said Letters Patent is hereby corrected as shown below:

<u>Claim 30, col. 8, line 6</u>

Delete "dr in" and replace with -- drying --

Signed and Sealed this
Twentieth Day of March, 2012

David J. Kappos
*Director of the United States Patent and Trademark Office*